US012669608B2

(12) United States Patent
Zhou et al.

(10) Patent No.: US 12,669,608 B2
(45) Date of Patent: Jun. 30, 2026

(54) LiDAR POINT CLOUD SEGMENTATION USING BOX PREDICTION

(71) Applicant: Motional AD LLC, Boston, MA (US)

(72) Inventors: Lubing Zhou, Singapore (SG); Xiaoli Meng, Singapore (SG); Karan Rajendra Shetti, Singapore (SG)

(73) Assignee: Motional AD LLC, Boston, MA (US)

( * ) Notice: Subject to any disclaimer, the term of this patent is extended or adjusted under 35 U.S.C. 154(b) by 933 days.

(21) Appl. No.: 17/740,604

(22) Filed: May 10, 2022

(65) Prior Publication Data

US 2022/0357453 A1 Nov. 10, 2022

Related U.S. Application Data

(60) Provisional application No. 63/186,465, filed on May 10, 2021.

(51) Int. Cl.
| | |
|---|---|
| *G01S 17/89* | (2020.01) |
| *G01S 13/931* | (2020.01) |
| *G01S 17/86* | (2020.01) |
| *G01S 17/931* | (2020.01) |
| *G06F 18/23* | (2023.01) |
| *G06V 10/20* | (2022.01) |

(Continued)

(52) U.S. Cl.
CPC .............. *G01S 17/89* (2013.01); *G01S 17/86* (2020.01); *G01S 17/931* (2020.01); *G06F 18/23* (2023.01); *G06V 10/255* (2022.01); *G06V 10/82* (2022.01); *G06V 20/58* (2022.01); *G06V 20/64* (2022.01); *G01S 2013/9316* (2020.01); *G06V 40/10* (2022.01)

(58) Field of Classification Search
CPC ........ G01S 17/89; G01S 17/86; G01S 17/931; G01S 2013/9316; G06F 18/23; G06V 10/255; G06V 10/82; G06V 20/58; G06V 20/64; G06V 40/10
See application file for complete search history.

(56) References Cited

U.S. PATENT DOCUMENTS

| | | | | | |
|---|---|---|---|---|---|
| 12,315,197 | B2 * | 5/2025 | Miao | .......................... | G06T 7/80 |
| 2018/0232583 | A1 * | 8/2018 | Wang | ..................... | G06V 10/82 |

(Continued)

OTHER PUBLICATIONS

Yang, Bo, et al. "Learning object bounding boxes for 3d instance segmentation on point clouds," Advances in neural information processing systems 32 (2019). (Year: 2019).*

(Continued)

*Primary Examiner* — Dominic J Bologna
(74) *Attorney, Agent, or Firm* — Fish & Richardson P.C.

(57) ABSTRACT

In an example method, a perception system receives first data representing a point cloud having a plurality of points, and clusters the points into a plurality of clusters. The clusters include a first cluster representing a first portion of an object and a second cluster representing a second portion of the object. Further, the perception system generates a first bounding box enclosing at least the first cluster and the second cluster, and generates a second bounding box enclosing at least the first cluster and the second cluster. The perception system selects either the first bounding box or the second bounding box, and outputs second data representing the object. The second data includes an indication of the selected bounding box and an indication of the object.

19 Claims, 18 Drawing Sheets

(51) Int. Cl.
  G06V 10/82        (2022.01)
  G06V 20/58        (2022.01)
  G06V 20/64        (2022.01)
  G06V 40/10        (2022.01)

(56)          References Cited

U.S. PATENT DOCUMENTS

| | | | | |
|---|---|---|---|---|
| 2018/0373980 A1* | 12/2018 | Huval | ..................... | G06F 18/41 |
| 2019/0355169 A1* | 11/2019 | Sapienza | ................ | H04N 23/65 |
| 2020/0134372 A1* | 4/2020 | Roy Chowdhury | . | G05D 1/0221 |
| 2021/0124351 A1* | 4/2021 | Chen | ....................... | G01S 17/66 |
| 2022/0012466 A1* | 1/2022 | Taghavi | .............. | G06F 18/2163 |
| 2022/0114752 A1* | 4/2022 | Kavulya | ................... | G06T 7/74 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
International Search Report and Written Opinion in International Appln. No. PCT/US2022/028600, dated Sep. 15, 2022, 8 pages.
Extended European Search Report in European Appln. No. 22808209. 5, mailed on May 2, 2025, 9 pages.
International Preliminary Report on Patentability in International Appln. No. PCT/US2022/028600, dated Nov. 23, 2023, 7 pages.

* cited by examiner

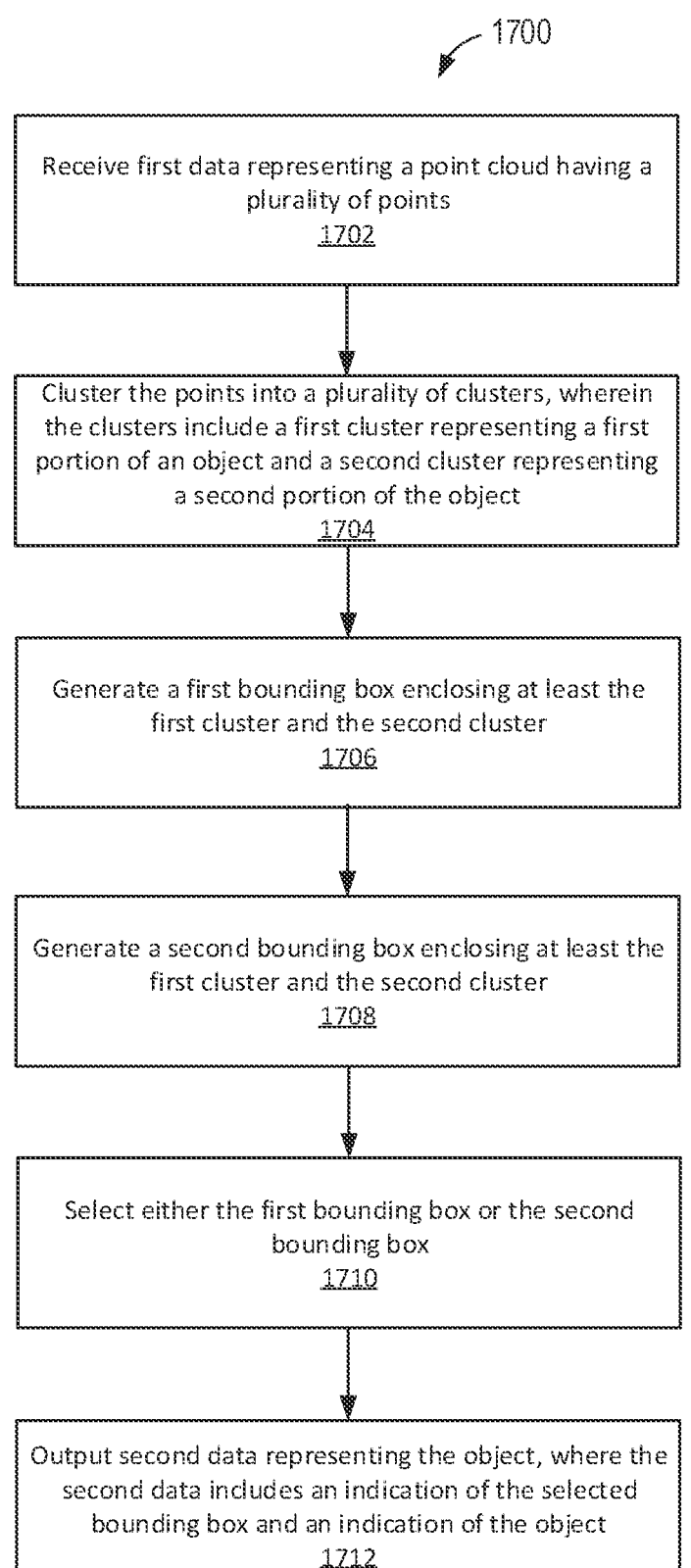

1700

Receive first data representing a point cloud having a plurality of points
1702

Cluster the points into a plurality of clusters, wherein the clusters include a first cluster representing a first portion of an object and a second cluster representing a second portion of the object
1704

Generate a first bounding box enclosing at least the first cluster and the second cluster
1706

Generate a second bounding box enclosing at least the first cluster and the second cluster
1708

Select either the first bounding box or the second bounding box
1710

Output second data representing the object, where the second data includes an indication of the selected bounding box and an indication of the object
1712

FIG. 17A

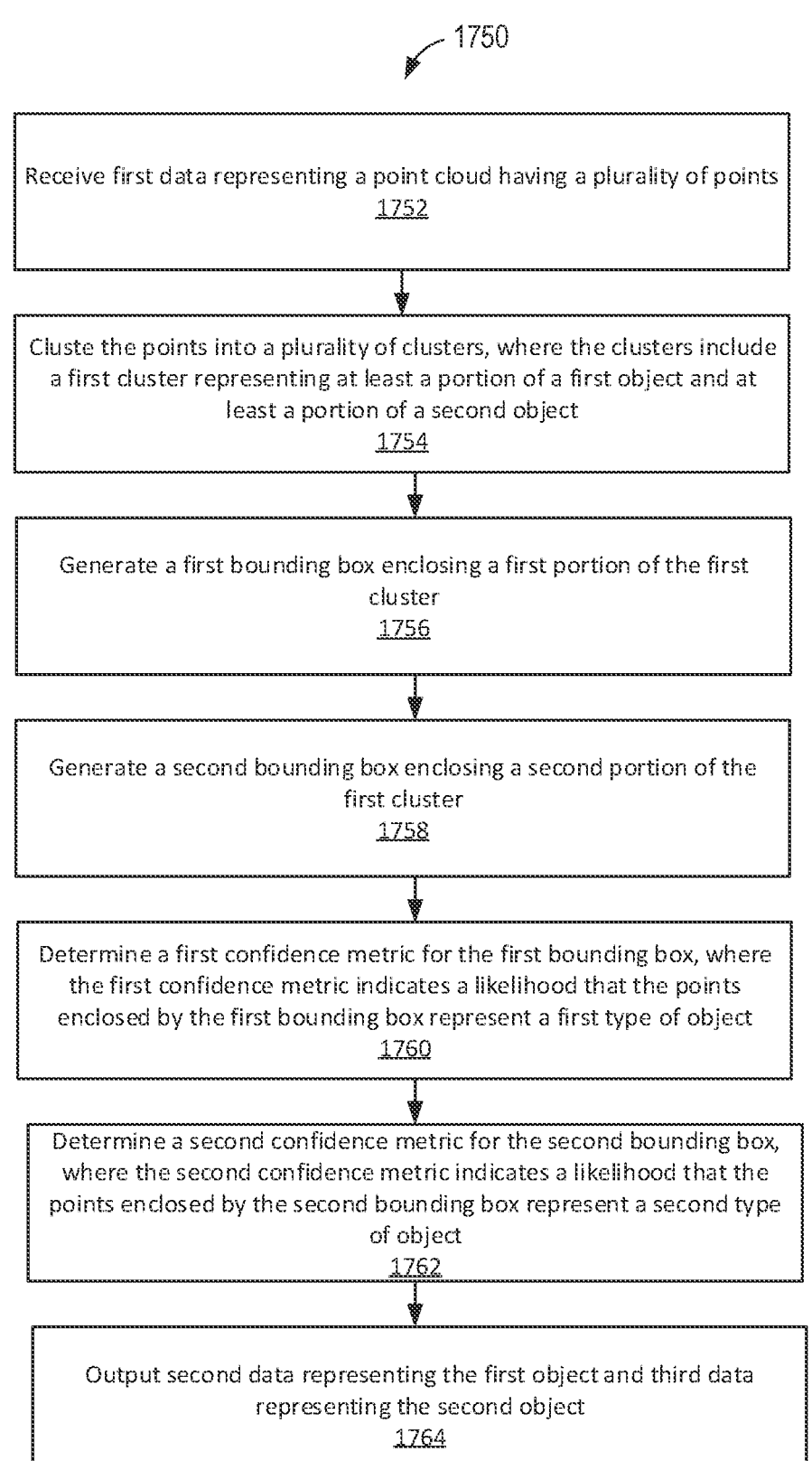

1750

Receive first data representing a point cloud having a plurality of points
1752

Cluste the points into a plurality of clusters, where the clusters include a first cluster representing at least a portion of a first object and at least a portion of a second object
1754

Generate a first bounding box enclosing a first portion of the first cluster
1756

Generate a second bounding box enclosing a second portion of the first cluster
1758

Determine a first confidence metric for the first bounding box, where the first confidence metric indicates a likelihood that the points enclosed by the first bounding box represent a first type of object
1760

Determine a second confidence metric for the second bounding box, where the second confidence metric indicates a likelihood that the points enclosed by the second bounding box represent a second type of object
1762

Output second data representing the first object and third data representing the second object
1764

FIG. 17B

LiDAR POINT CLOUD SEGMENTATION USING BOX PREDICTION

CROSS-REFERENCE TO RELATED APPLICATION

This application claims the benefit of U.S. Provisional Application 63/186,465, filed on May 10, 2021, which is incorporated herein by reference in its entirety.

FIELD OF THE INVENTION

This description relates to segmenting and classifying point clouds, such as point clouds generated using a Light Detection and Ranging (LiDAR) system.

BACKGROUND

An autonomous vehicle (AV) can use a LiDAR system to determine the locations of objects in the environment of the AV. For instance, an AV can use a LiDAR system to scan an environment of the AV, and generate a point cloud indicating points on the exterior surfaces of one or more objects in proximity to the AV. Further, the AV can segment the points into multiple clusters, where each cluster is associated with a different respective object in the environment. Each cluster can be used to determine the characteristics of a respective object (e.g., the object's type, the dimensions of the object, etc.), identify the location of that object relative to the AV, and/or predict a future location of that object relative to the AV.

BRIEF DESCRIPTION OF THE DRAWINGS

FIG. 17A shows a flow diagram of an example process for correcting over-segmentation of a point cloud.

FIG. 17B shows a flow diagram of an example process for correcting under-segmentation of a point cloud.

DETAILED DESCRIPTION

Figure 1:
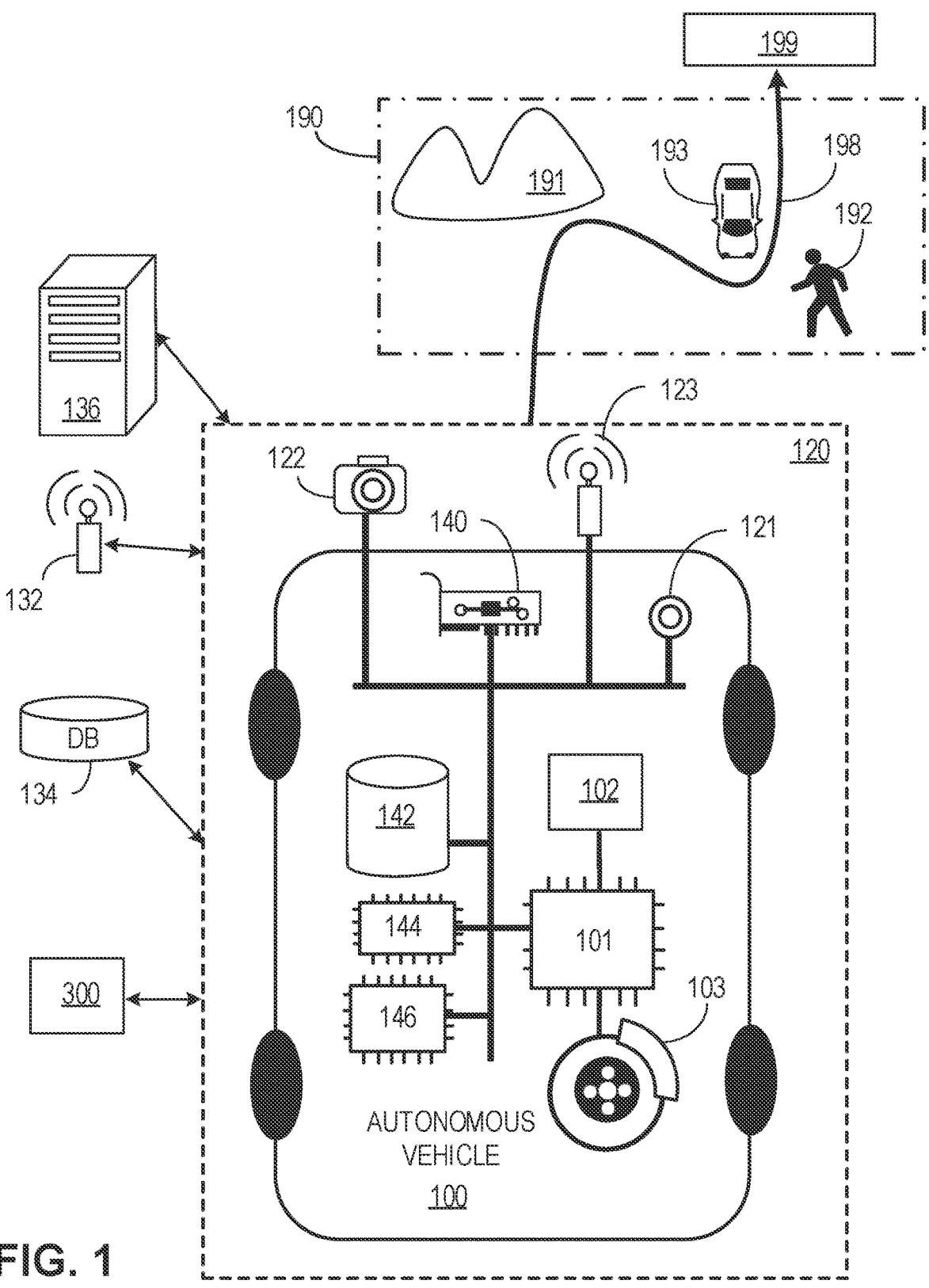
FIG. 1 shows an example of an AV having autonomous capability.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Planning
6. AV Control
7. AV Cluster segmentation and classification system General Overview LiDAR systems can be used to generate point clouds representing one or more objects in an environment. As an example, an AV can include a LiDAR system that scans the environment around the AV and generates point clouds indicating the position of other vehicles, pedestrians, obstacles, etc. in proximity to the AV.

In some cases, a point cloud (or a portion thereof) can "over-segmented," such that a single object is erroneously represented by multiple clusters of points. In other cases, a point cloud (or a portion thereof) can be "under-segmented," such that multiple objects are erroneously represented by a single cluster of points.

To reduce over-segmentation, for each cluster of points, a bounding box can be "predicted" (e.g., using a machine learning) such that the bounding box encloses that cluster of points and another adjacent cluster of points. Multiple bounding boxes can be merged together (e.g., using non-maximal suppression), such that the resulting box encloses multiple clusters of points, each corresponding to the same object.

To reduce under-segmentation, for each cluster of points, multiple bounding boxes can be "predicted" (e.g., using a machine learning) such that the bounding boxes enclose different respective portions of the cluster. Bounding boxes can be selected such that the each of the bounding boxes encloses points corresponding to a different respective object.

Some of the advantages of these techniques include improving the accuracy with which systems (e.g., perception systems, etc.) of an AV identify objects based on sensor data (e.g., LiDAR data associated with a point cloud, etc.).

For example, in the case of over-segmentation, without implementing some of the techniques described herein, a LiDAR system may be used to generate data associated with a point cloud that is transmitted to a system (e.g., a perception system). The system, in turn, may erroneously identify a single vehicle as two different vehicles based on the point cloud. Having misidentified the vehicle as two vehicles, the system may generate trajectories that would cause the AV to attempt to drive between the two supposed vehicles, and the trajectories (if used to control the AV) would result in a collision with the actual vehicle.

As another example, in the case of under-segmentation, without implementing some of the techniques described herein, a LiDAR system may be used to generate data associated with a point cloud that is transmitted to a system (e.g., a perception system). In system, in turn, may erroneously identify multiple pedestrians as a single pedestrian. Having misidentified the pedestrians as a single pedestrian, the system may generate trajectories that do not take into account the possibility of the pedestrians moving independently from one another, and the trajectories (if used to control the AV) may cause the AV to move in an unintended manner relative to one or more of the pedestrians.

The techniques described in this application can reduce the likelihood of over-segmentation and under-segmentation. Accordingly, the AV can identify objects more accurately and conduct autonomous operations more safely.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an AV (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

As used herein, "homotopy" means a subset of a set of constraints on a trajectory of an AV that the AV can adhere to while traversing a particular route.

As used herein, "feasible" means whether an AV can adhere to a constraint in a homotopy while traveling to a destination.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
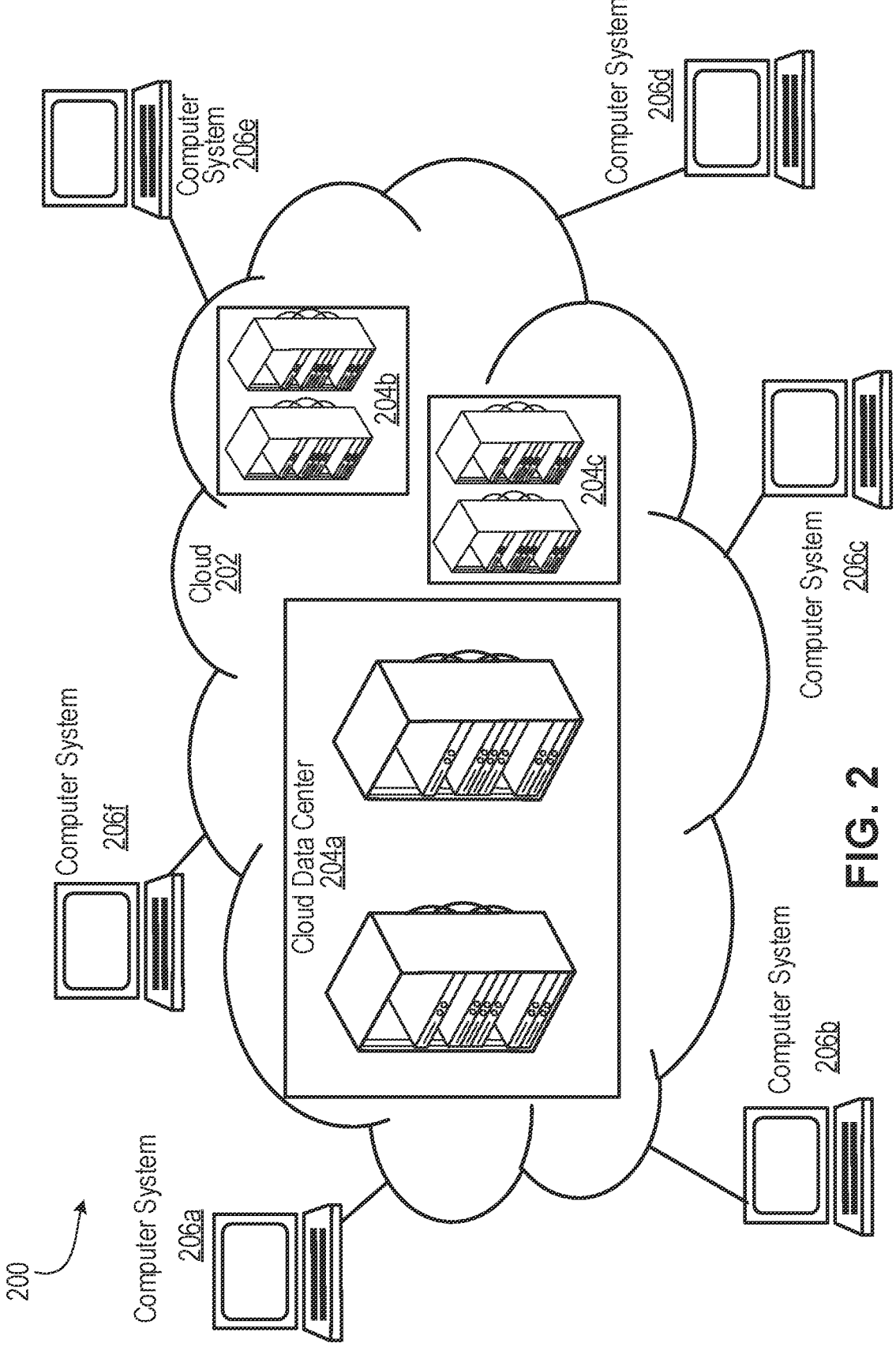
FIG. 2 shows an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (e.g., networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
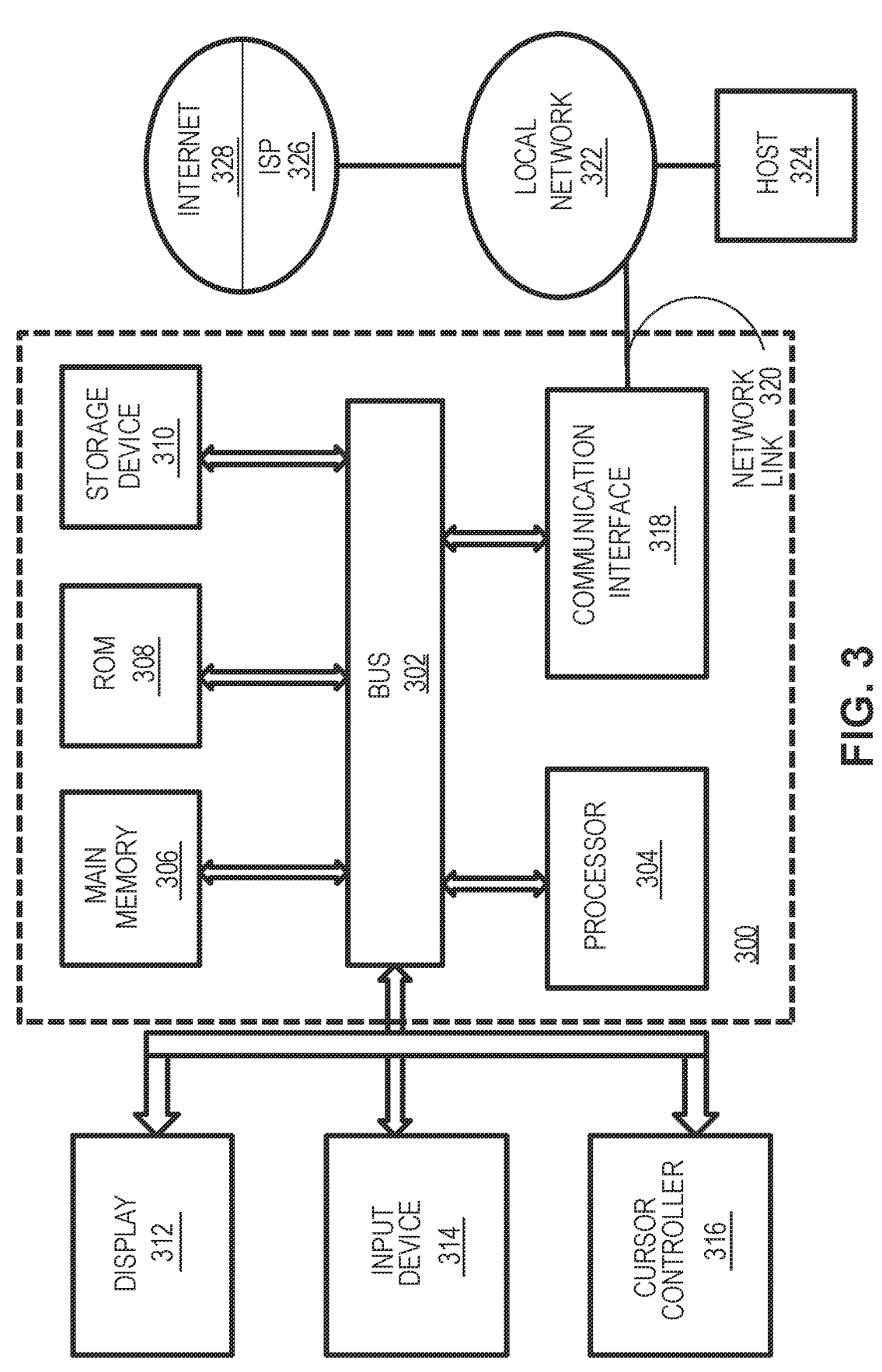
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
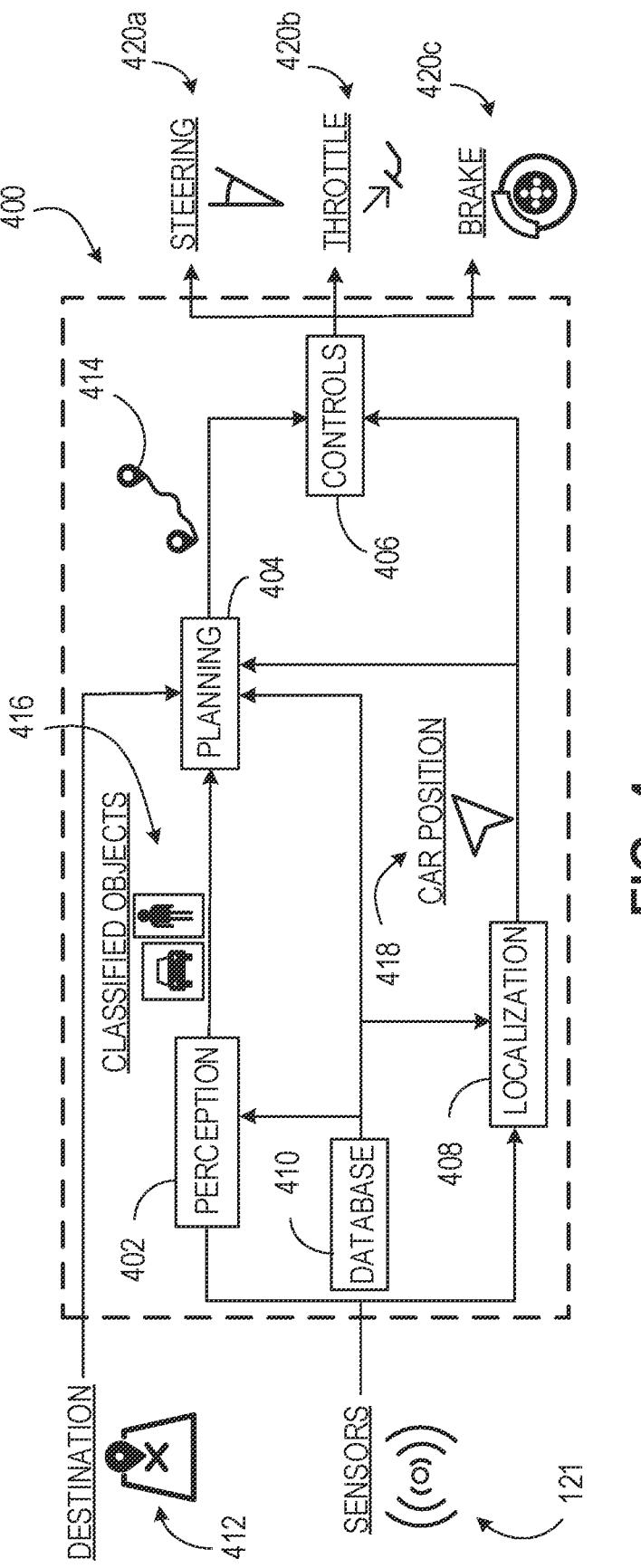
FIG. 4 shows an example architecture for an AV.

FIG. 4 shows an example architecture 400 for an AV (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition system) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

AV Inputs

Figure 5:
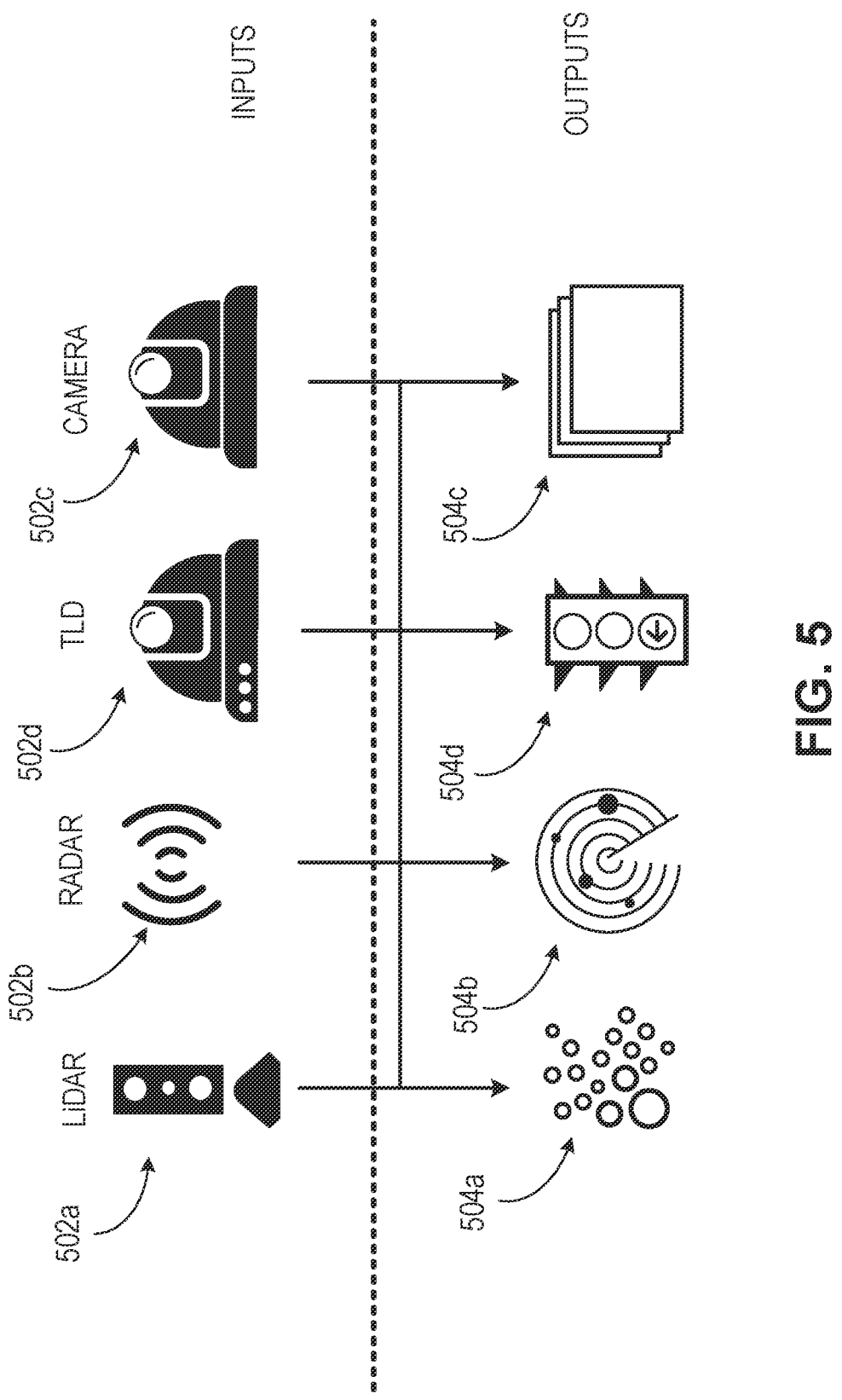
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
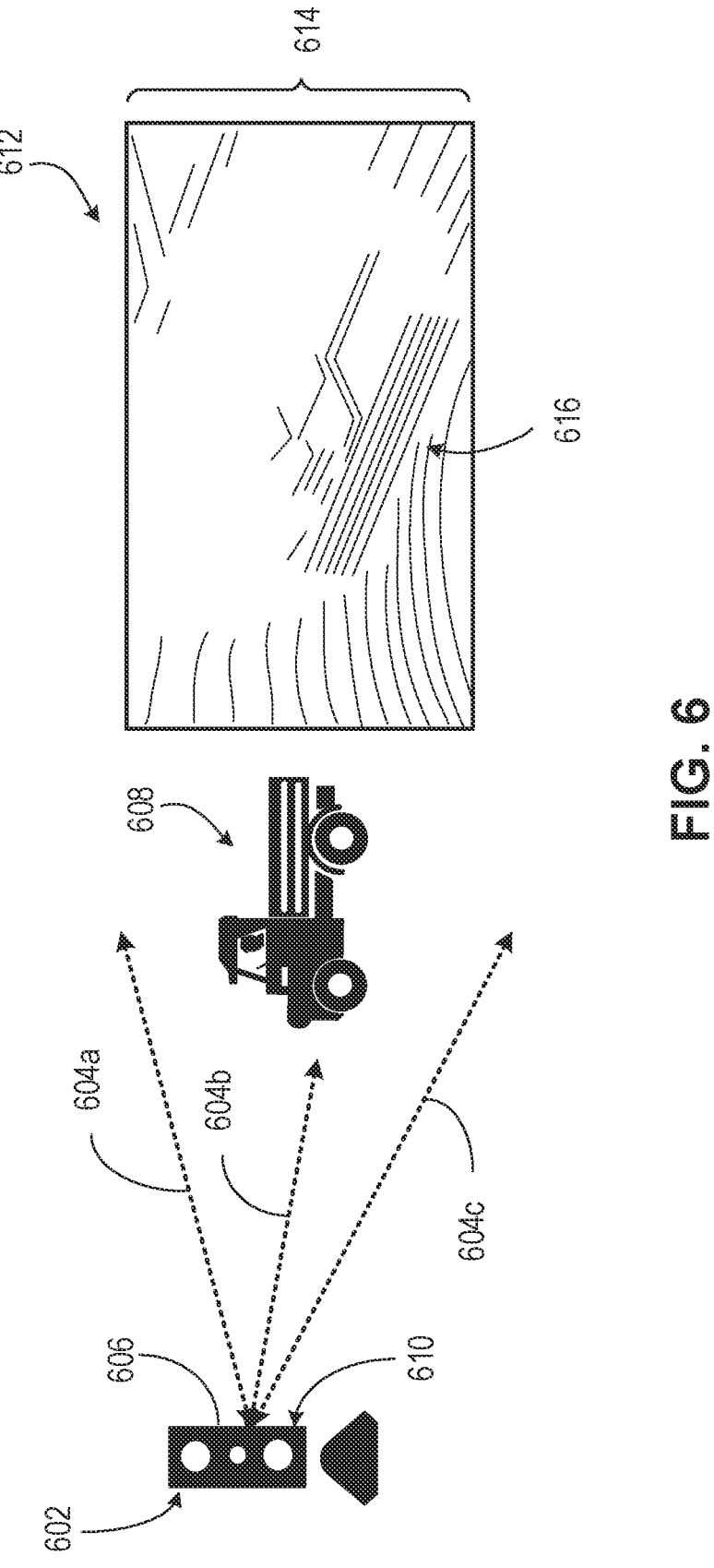
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
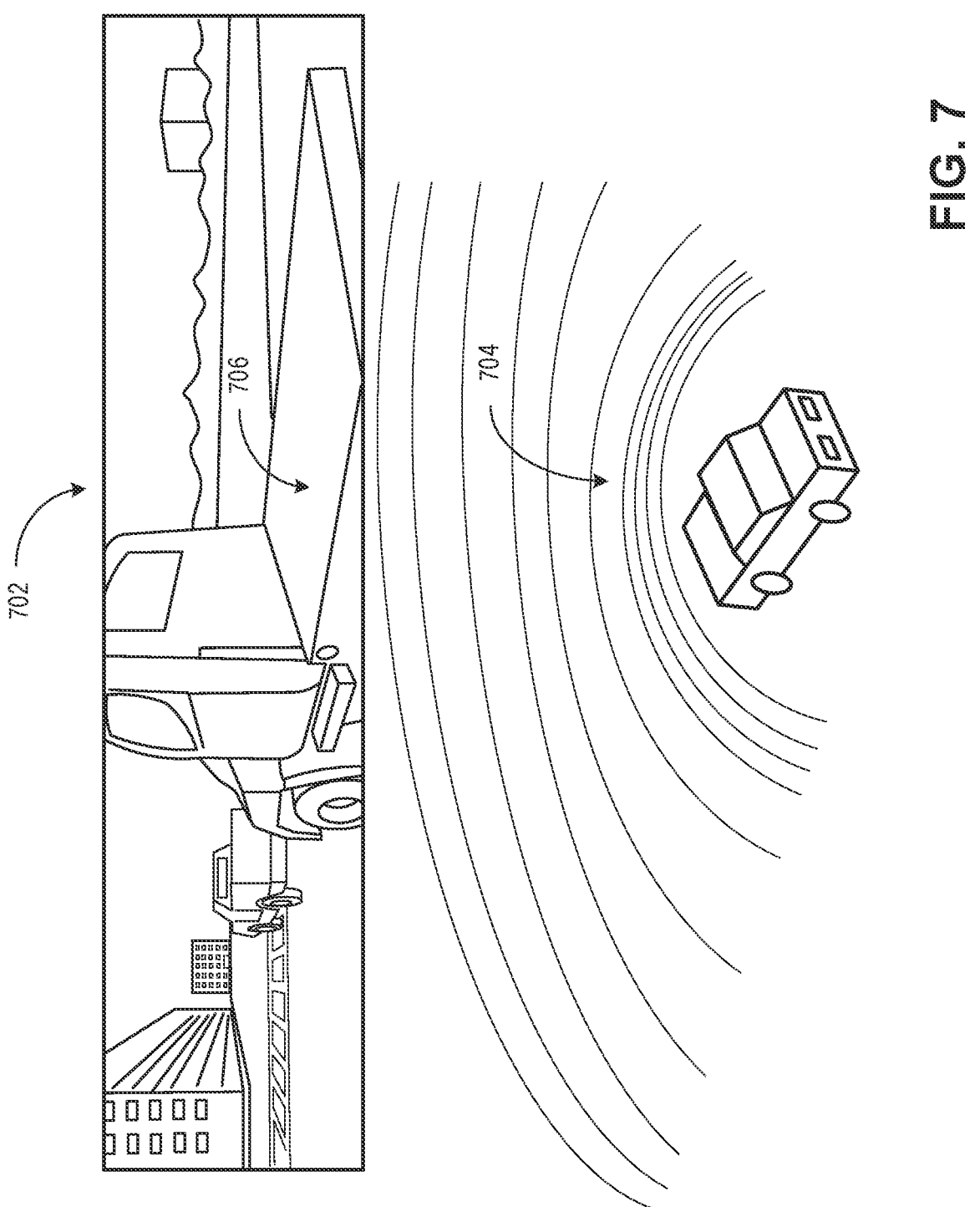
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
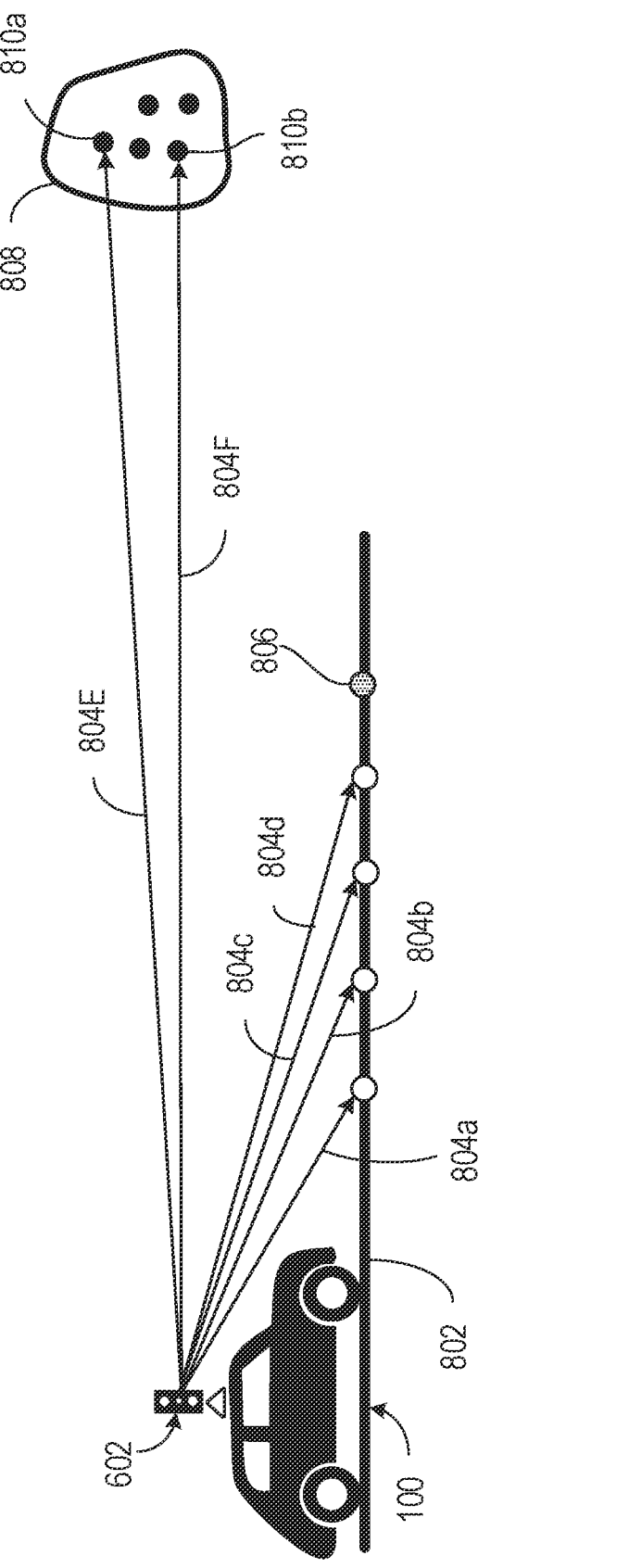
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
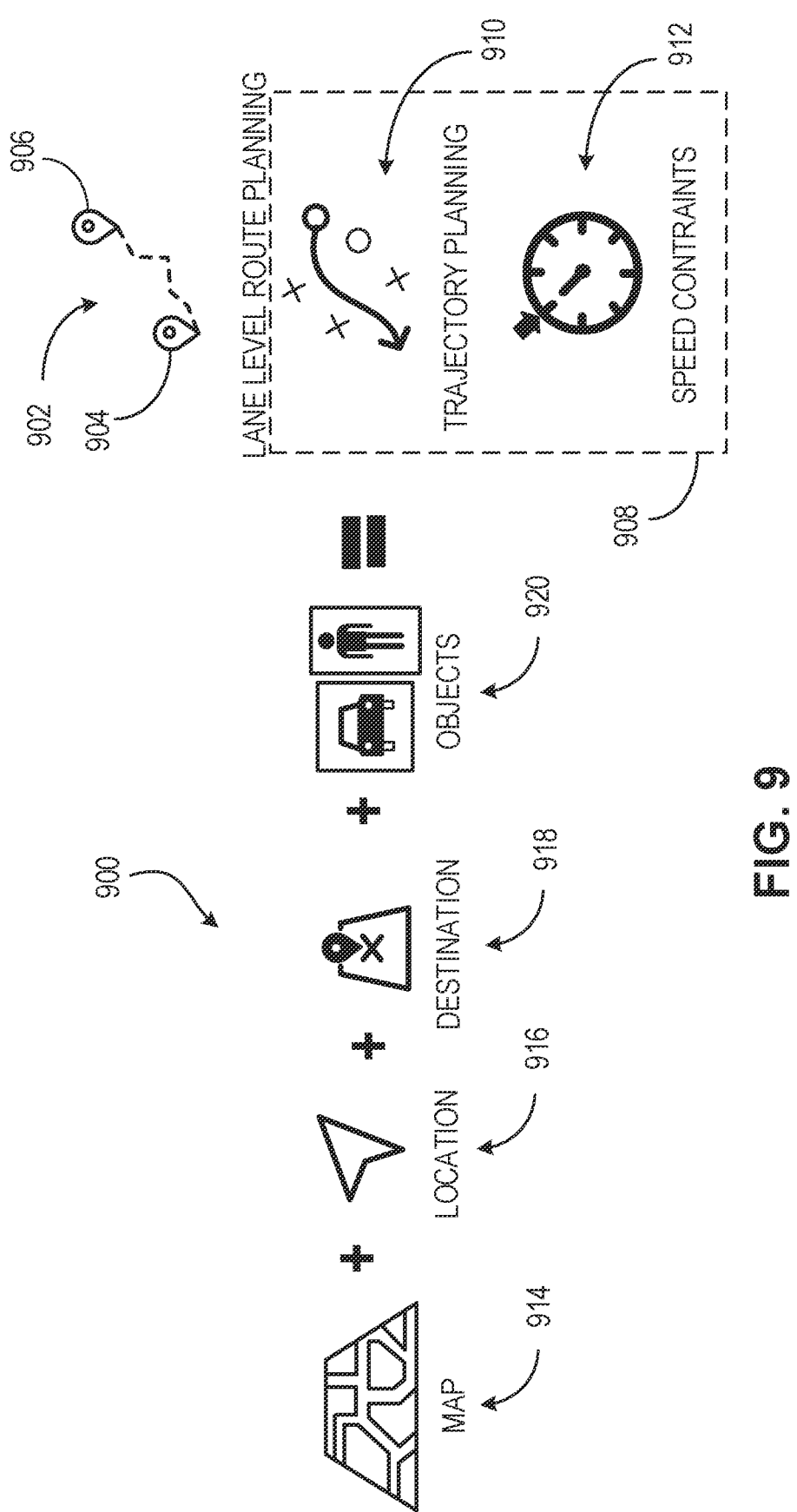
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or un-expected traffic, the speed constraints 912 can limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning, also referred to as a "rulebook." Rules are specified using a formal language, e.g., using Boolean logic or linear temporal logic (LTL). In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
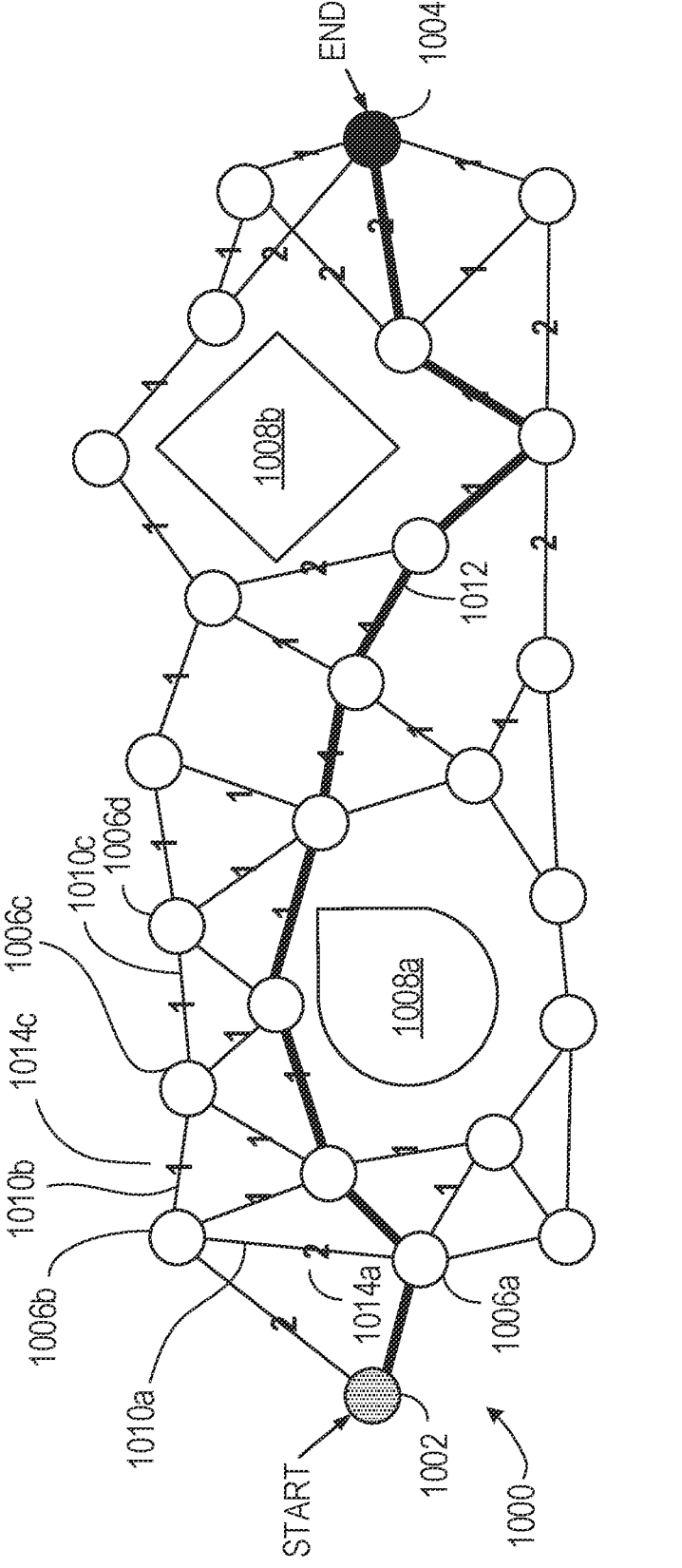
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 can be relatively large (e.g., in two different metropolitan areas) or can be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information over at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other enti-ties with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (i.e., the AV 100 travels between the two physical positions represented by the respective nodes). The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or map constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a can be twice the associated cost 1014b of the second edge 1010b. Other factors that affect time include expected traffic, number of intersections, speed limit, etc. Another typical resource is fuel economy. Two edges 1010a-b can represent the same physical distance, but one edge 1010a can require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

AV Control

Figure 11:
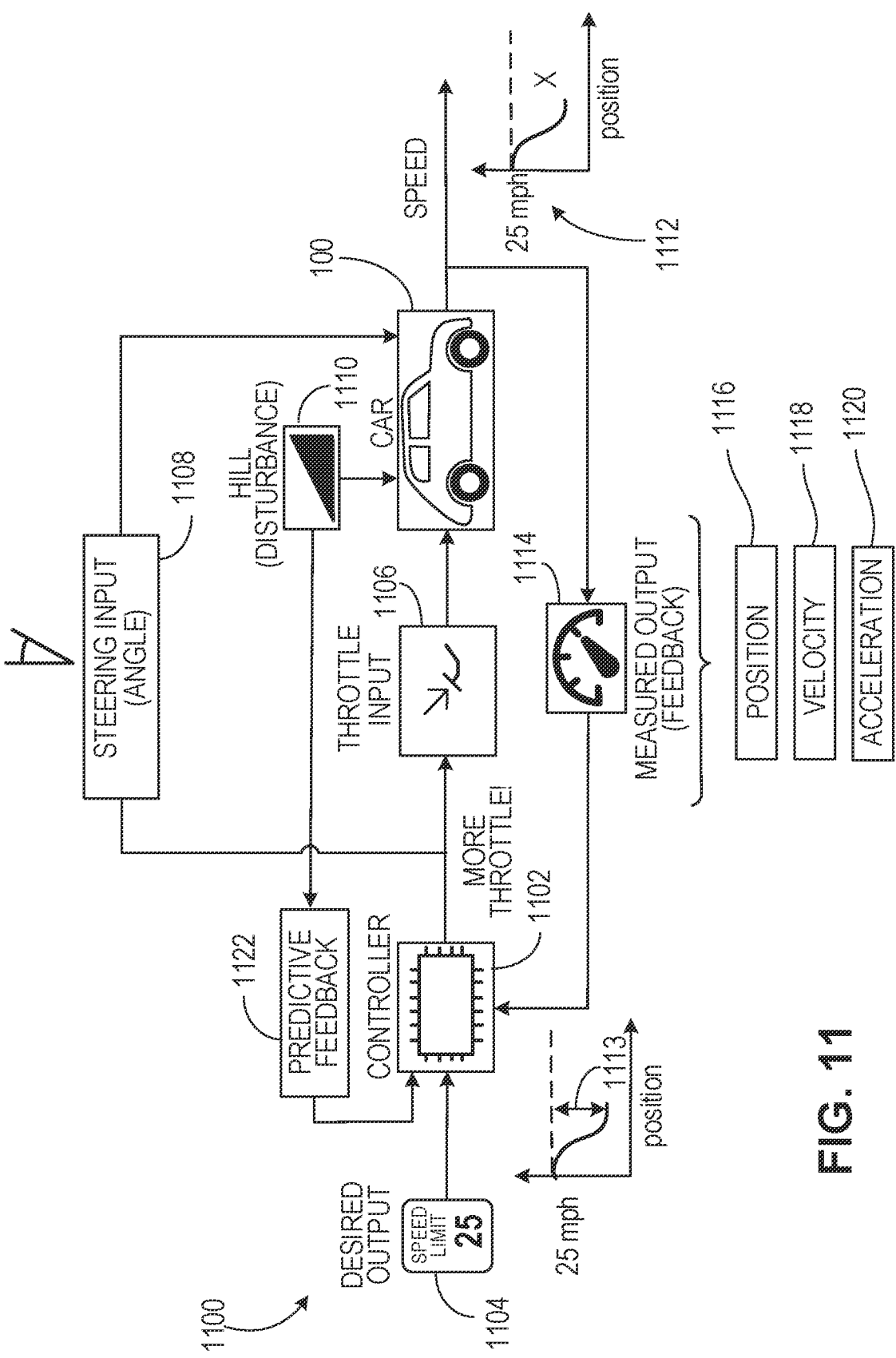
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as micropro-cessors or microcontrollers or both) similar to processor

304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
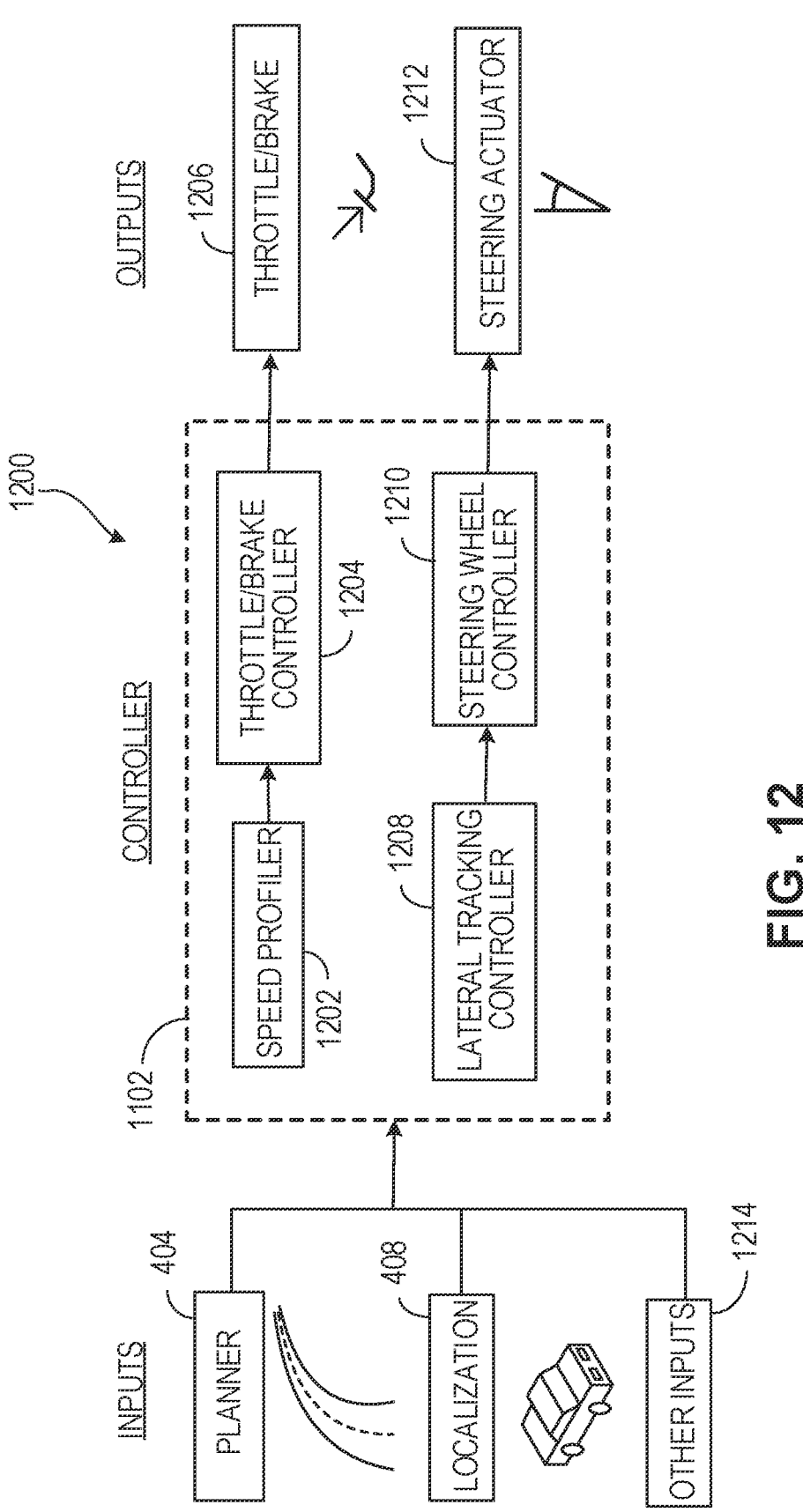
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

AV Cluster Segmentation and Classification System

As described herein (e.g., with respect to FIG. 4), an AV can include a perception module 402 configured to identify physical objects in the environment of the AV, determine the locations of the objects relative to the AV, and classify the objects based on type. Further, the perception module 402 can provide a scene description including the classified objects to a planning module 404 to determine one or more trajectories that can be traveled by the AV to reach a particular destination.

In some implementation, the perception module 402 can identify objects, determine the locations of those objects, and classify those objects based on sensor data obtained by one or more sensors 121. For example, as described above (e.g., with respect to FIGS. 1 and 5-7), an AV can include a LiDAR system (e.g., a LiDAR system 123, 502a, and/or 602) that uses light to obtain data about objects in its line of sight, and outputs collections of 3D or 2D points that are used to construct a representation of the environment. These collections of points may be referred to be "point clouds."

In some implementations, the perception module 402 can segment the point cloud into multiple clusters, where each cluster represents a different respective object in the environment of the AV. This can beneficial, for example, in enabling the perception module 402 to determine the dimensions, location, and/or type of each of the objects more accurately. Accordingly, the planning module 404 can determine trajectories that enable the AV to navigate the environment more safely and in a more effective manner.

In some cases, the perception module 402 may "over-segment" a point cloud (or a portion thereof), such that a single object is erroneously represented by multiple clusters of points. In other cases, the perception module 402 may "under-segment" a point cloud (or a portion thereof), such that multiple objects are erroneously represented by a single cluster of points.

To reduce over-segmentation, for each cluster of points, the perception module 402 can "predict" a bounding box (e.g., using a machine learning) such that the bounding box encloses that cluster of points and another adjacent cluster of points. Multiple bounding boxes can be merged together (e.g., using non-maximal suppression), such that the resulting box encloses multiple clusters of points, each corresponding to the same object.

To reduce under-segmentation, for each cluster of points, the perception module 402 can "predict" multiple bounding boxes (e.g., using a machine learning) such that the bounding boxes enclose different respective portions of the cluster. Bounding boxes can be selected such that each of the bounding boxes encloses points corresponding to a different respective object.

These techniques can improve the accuracy with which the perception system 402 identifies objects based on sensor data, and can enable AVs to conduct autonomous operations more safely and in a more effective manner.

Figure 13:
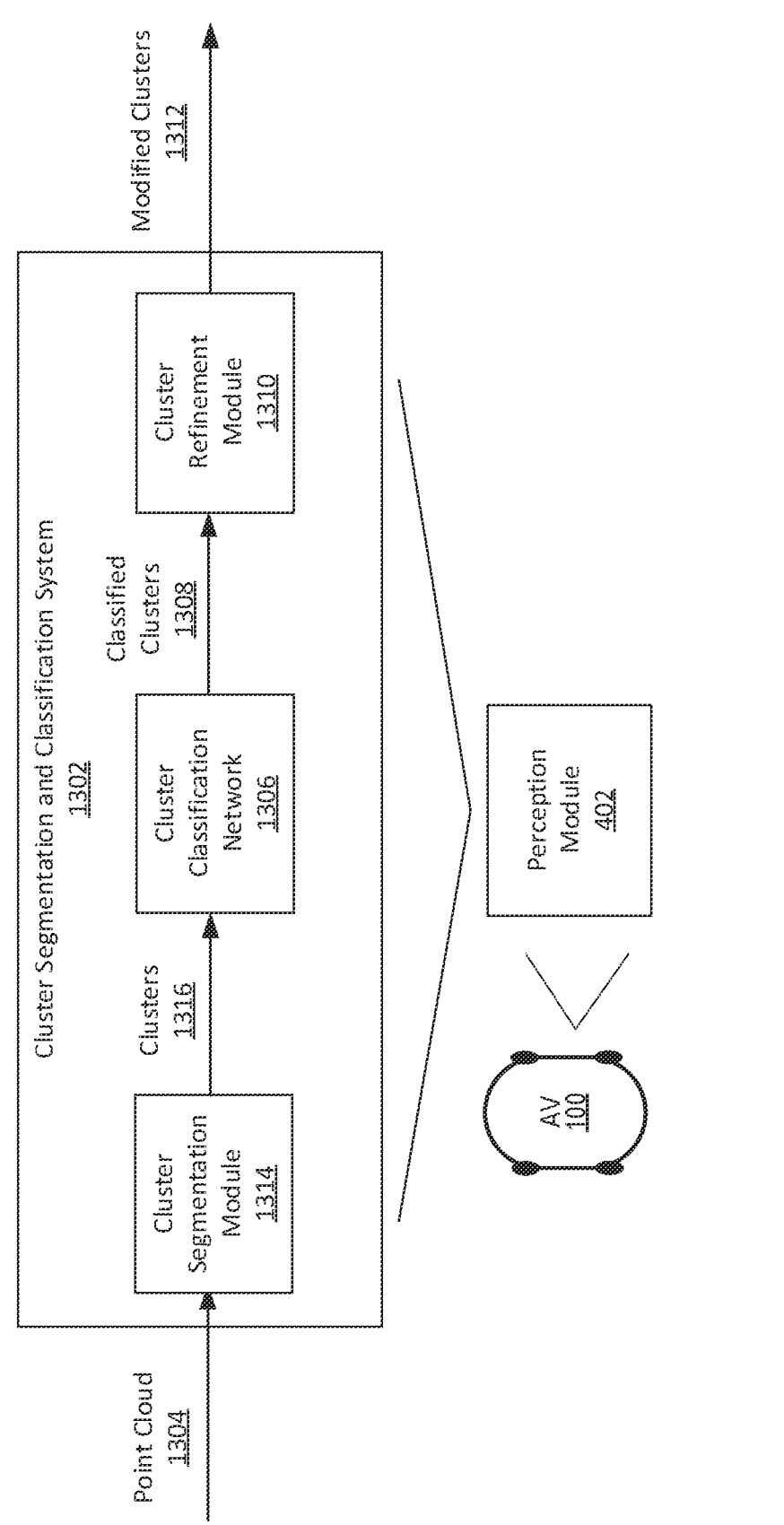
FIG. 13 shows an example cluster segmentation and classification system for clustering point points into clusters and classifying each of the clusters of points.

FIG. 13 shows an example cluster segmentation and classification system 1302 for clustering point points into clusters and classifying each of the clusters of points. In some implementations, the AV cluster segmentation and classification system 1302 can be included in a perception module 402 in an AV 100.

The cluster segmentation and classification system 1302 includes a cluster segmentation module 1314, a cluster classification network 1306, and a cluster refinement module 1310. The cluster segmentation and classification system 1302 (including the cluster segmentation module 1314, the cluster classification network 1306, and the cluster refinement module 1310) can be implemented, at least in part, using one or more computer systems (e.g., a cloud server 136, a computing environment 200, and/or a computer system 300, as shown in FIGS. 1-3).

During an example operation of the cluster segmentation and classification system 1302, the cluster segmentation and classification system 1302 receives a point cloud 1304. The point cloud 1304 includes a collection of points that represent one or more objects in an environment of the AV 100. As an example, each of the points in the point cloud 1304 can indicate a respective point on the exterior surfaces of one or more objects in proximity to the AV 100. In some implementations, the point cloud 1304 can include the location of each of its points (e.g., according to a Cartesian coordinate system), as well as additional information regarding each of the points (e.g., an intensity of each of the points).

In some implementations, the point cloud 1304 can be generated, at least in part, using a LiDAR system (e.g., a LiDAR system 123, 502*a*, and/or 602). For example, the point cloud 1304 can include at least some of the outer 504*a* generated by the LiDAR system 502*a* (e.g., as described with respect to FIGS. 5-7).

The cluster segmentation module 1314 receives the point cloud 1304, and segments the point cloud 1304 into one or more clusters of points 1308. In some implementations, the cluster segmentation module 1314 can segment the point cloud 1304 using a graph-based segmentation technique.

The cluster classification network 1306 receives the clusters of points 1316, classifies the clusters of points 1316, and outputs the classified clusters 1308). As an example, the cluster classification network 1306 can determine whether each of the clusters of points 1316 represents a different respective object in the environment of the AV 100. Further, the classification network 1306 can determine additional information regarding each of the objects. For instance, for each of the clusters of points, the classification network 1306 can determine the location of the object represented by that cluster (e.g., an absolute location, or a location relative to the AV 100) and the dimension and shape of the object. Further, for each of the clusters of points, the classification network 1306 can determine the type of object represented by that cluster. For instance, for each of the clusters of points, the classification network 1306 can determine whether the object represented by that cluster is a pedestrian, a bicycle, an automobile, a traffic sign, a barrier, a tree, a building, a bridge, or any other type of object. Further, for each of the clusters of points, the classification network 1306 can determine a confidence metric representing a likelihood that the cluster represents an object of the determined type.

Figure 14:
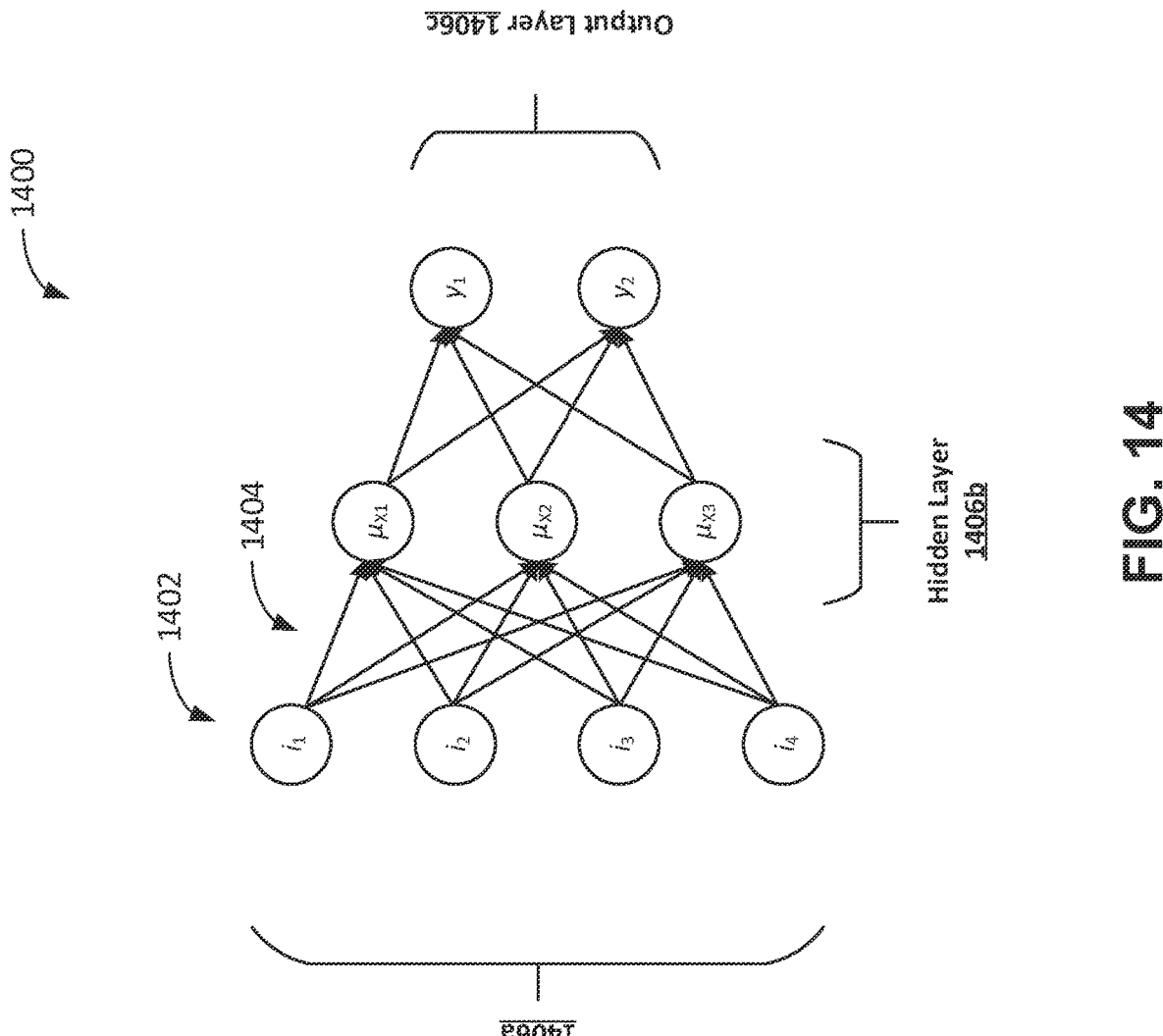
FIG. 14 shows an example neural network 1400.

In some implementations, the cluster classification network 1306 can be (can otherwise include) a neural network configured to receive information regarding clusters of points, and classify each of the clusters based on the characteristics of the clusters. A simplified example of a neural network 1400 is shown in FIG. 14.

The neural network 1400 includes several nodes 1402 (often called "neurons") interconnected with another by interconnections 1404. Further, the nodes 1402 are arranged according to multiple layers, including an input layer 1406*a*, a hidden layer 1406*b*, and an output layer 1406*c*. The arrangement of the nodes 1402 and the interconnections 1404 between them represent a mathematical transformation of input data (e.g., as received by the nodes of the input layer 1406*a*) into corresponding output data (e.g., as output by the nodes of the output layer 1406*c*). In some implementations, the input data can represent data regarding the point cloud 1304, and the output data can represent one or more corresponding classified clusters 1308*s* generated by the cluster classification network 1306 based on the input data.

The nodes 1402 of the input layer 1406*a* receive input values and output the received input values to respective nodes of the next layer of the neural network 1400 (e.g., as one or more individual numerical values, or as a feature vector having one or more dimensions and one or more corresponding values). In this example, the neural network 1400 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (e.g., as indicated by the interconnections 1404).

The nodes of the hidden layer 1406*b* receive input values (e.g., from the nodes of the input layer 1406*a* or nodes of other hidden layers), applies particular transformations to the received values, and outputs the transformed values to respective nodes of the next layer of the neural network 1400 (e.g., as indicated by the interconnections 1404). The output of each of the nodes can be one or more individual numerical values and/or one or more feature vectors having one or more dimensions and one or more corresponding values. In this example, the neural network 1400 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 1406*b* can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n} (\text{weight}_i * \text{input}_i) + \text{bias},$$

where weight$_i$ is the weight that is applied to an input input$_i$, bias is a bias or offset value is that is applied to the sum of the weighted inputs, and Y is the output of the node.

The nodes of the output layer 1406c receive input values (for example from the nodes of the hidden layer 1406b) and output the received values. In some implementations, nodes of the output layer 1406c can also receive one or more input values, and transform the one or more received values according to a mathematical transfer function (e.g., in a similar manner as the nodes of the hidden layer 1406b). As an example, the values that are received by a node can be used as input values in particular transfer function, and the value that is output by the transfer function can be used as the output of the node. In some implementations, a transfer function can be a non-linear function. In some implementations, a transfer function can be a linear function. The output of each of the nodes can be one or more individual numerical values and/or one or more feature vectors having one or more dimensions and one or more corresponding values.

In some implementations, at least one of the nodes of the output layer 1406c can represent a segmentation of the point cloud 1304 into one or more clusters of points. As an example, at least one of the nodes of the output layer 1406c can represent a boundary that encloses a portion of the point cloud 1304 that corresponds to a particular object in the environment of the AV 100. Further, the boundary can separate that portion of the point cloud 1304 from other portions of the point cloud 1304 (e.g., portions that represent other objects in the environment of the AV 100). In some implementations, a boundary can be a quadrilateral (e.g., a rectangular or square), and at least one of the nodes of the output layer 1406c can represent the locations of the vertices and/or edges of the quadrilateral.

Further, at least one of the nodes of the output layer 1406c can represent a prediction of the type of object represented by the portion of the point cloud that is enclosed by the boundary. For example, at least one of the nodes of the output layer 1406c can indicate whether the portion of the point cloud that is enclosed by the boundary is predicted to be a bicycle, an automobile, a traffic sign, a barrier, a tree, a building, a bridge, or any other type of object.

Further, at least one of the nodes of the output layer 1406c can represent a confidence metric associated with the object type prediction. For instance, if the prediction is more likely to be correct, the confidence metric can have a higher value, whereas if the prediction is less likely to be correct, the confidence metric can have a lower value.

In this example, the neural network 1400 includes two output nodes y$_1$ and y$_2$, each of which receives respective input values from the nodes $\mu_{x1}$, $\mu_{x2}$, and $\mu_{x3}$, applies a respective transformation to the received values, and outputs the transformed values as outputs of the neural network 1400. Further, each node in one layer is connected to all of the nodes in the next layer (e.g., forming a "fully connected" network).

Although FIG. 14 shows example nodes and example interconnections between them, this is merely an illustrative example. In practice, a neural network can include any number of nodes that are interconnected according to any arrangement. Further, although FIG. 14 shows a neural network 1400 having a single hidden layer 1406b, in practice, a network can include any number of hidden layers (e.g., one, two, three, four, or more), or none at all. Further, a neural network 1400 can be a fully connected network or a partially connected network (e.g., a neural network in which at least some of the nodes in one layer are connected to only a subset of the nodes in the next layer).

In some implementations, the neural network 1400 can be trained based on training data that provides "ground truth" examples that can aid in the accurate segmentation and classifications of point clouds. As an example, training data can include example input data (e.g., representing previously processed point clouds) and example output data (e.g., representing an accurate segmentation and classification of those point clouds into respective classified clusters). Based on the arrangement of the nodes and the interconnections between them, the cluster segmentation and classification system 1302 can identify transfer functions for each of the nodes that would result in the output of the neural network 1400 matching or otherwise being similar to the output data in the training data, given the same input data. In some implementations, the cluster segmentation and classification system 1302 can select particular weights or biases for each of the transfer functions. In some implementations, this can be performed iteratively (e.g., using successive sets of training data).

Referring back to FIG. 13, the classified clusters 1308 are provided to the cluster refinement module 1310. The cluster refinement module 1310 processes each of the classified clusters 1308, and modifies one or more of the classified clusters 1308 to improve the accuracy by the point cloud 1304 is segmented and classified. The cluster refine module 1310 outputs the modified cluster 1312 for further processing. In some implementations, the modified clusters 1312 can be used to track the identities and locations of objects in the environment of the AV 100 over time. In some implementations, the modified clusters 1312 can be used to determine the classified objects 416 (e.g., as described with reference to FIG. 4) to aid in the generation of one or more trajectories by the planning module 404.

In some implementations, the cluster refinement module 1310 can determine that the classified clusters 1308 are over-segmented. For example, a single object may be erroneously represented by multiple clusters of points. Based on this determination, the cluster refinement module 1310 can modify the classified clusters 1308, such as by merging two or more of the clusters into a single common cluster.

In some implementations, the cluster refinement module 1310 can determine that the classified clusters 1308 are under-segmented. For example, multiple objects may be erroneously represented by a single cluster of points. Based on this determination, the cluster refinement module 1310 can modify the classified clusters 1308, such as by splitting a single cluster into two or more clusters.

Example techniques for reducing over-segmentation and reducing under-segmentation are described in further detail below.

Figures 15A, 15B, 15C:
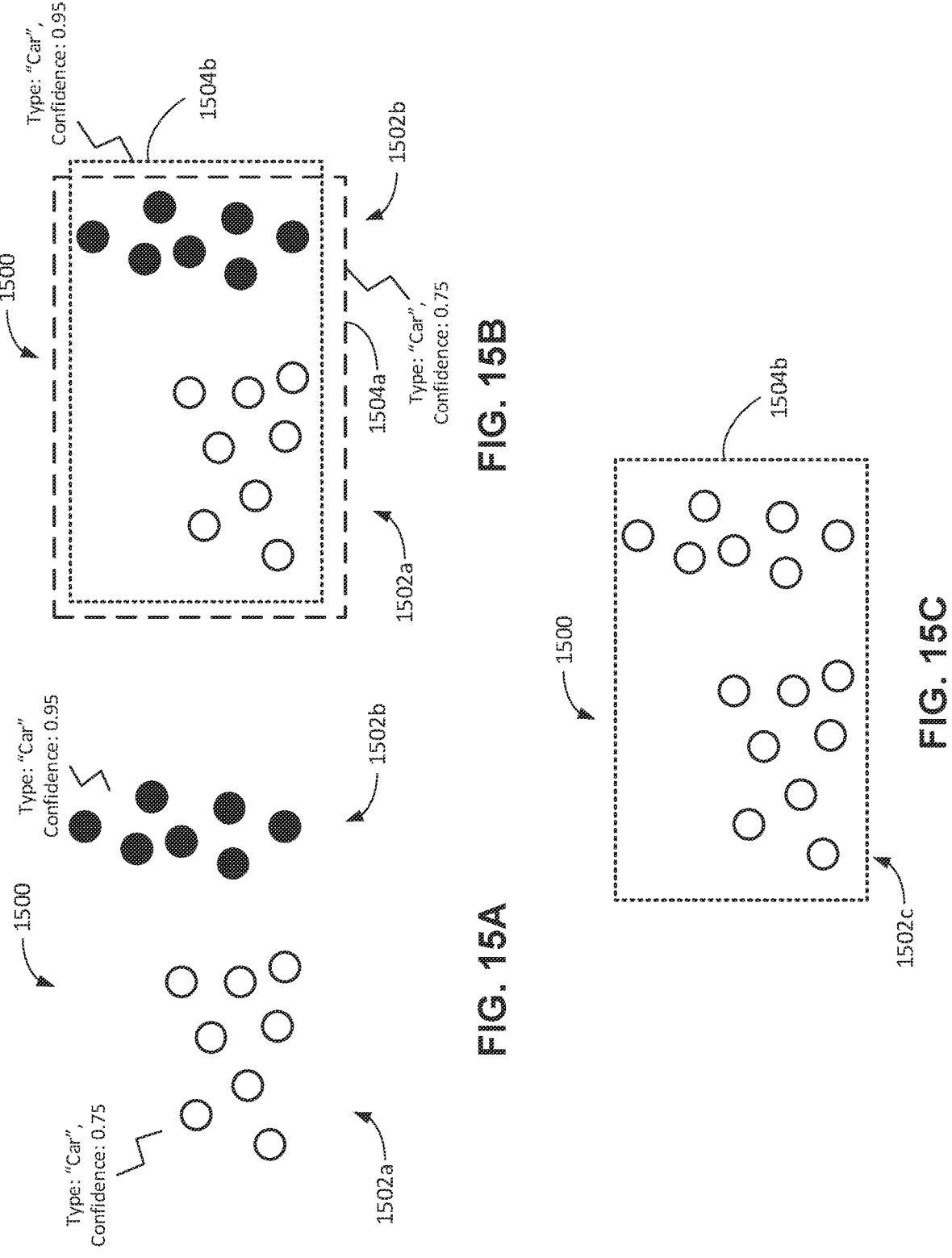
FIGS. 15A-15C show an example process for correcting over-segmentation of a point cloud.

FIGS. 15A-15C show an example process for correcting over-segmentation. This process can be performed, for example, by the cluster classification network 1306 and the cluster refinement module 1310 to modify the output of the cluster segmentation module 1314.

As shown in FIG. 15A, a point cloud 1500 is initially segmented into two sets of points 1502a and 1502b. This segmentation can be the output of the cluster segmentation module 1314. For example, as shown FIG. 15A, the cluster segmentation module 1314 can initially predict that the point cloud 1500 represents two different objects in the environment of the AV 100. Further, the cluster segmentation module 1314 can initially predict that a first set of point 1502a (represented by white circles) corresponds to one of those objects, whereas the set of points 1502*b* (represented by black circles) corresponds to the other object.

The cluster classification network classifies each of the sets of points 1502*a* and 1502*b* that are output by the cluster segmentation module 1314. As an example, the cluster classification network 1306 can predict a type of object represented by each of the sets of points 1502*a* and 1502*b*, and a confidence metric associated with the prediction. For instance, in this example, the cluster classification network 1306 predicts that the first set of points 1502*a* represents a car, with a confidence metric of 0.75. Further, the cluster classification network 1306 predicts that the second set of points 1502*b* also represents a car, with a confidence metric of 0.95.

The cluster refinement module 1310 analyzes the point cloud 1500 to determine whether the first set of points 1502*a* and the second set of points 1502*b* in fact correspond to a single common object, rather than different respective objects.

For example, the cluster refinement module 1310 can generate a first bounding box 1504*a* for the first set of points 1502*a*, such that it encloses the first set of points 1502*a* and at least a portion of one or more other sets of points that are spatially adjacent to the first set of points 1502*a*. Sets of points can be spatially adjacent to one another, for example, if the points are within a particular spatial distance from one another (e.g., within a particular threshold distance). In the example shown in FIG. 15B, the first bounding box 1504*a* is generated such that it encloses both the first set of points 1502*a* and the second set of points 1502*b*.

Further, the cluster refinement module 1310 can generate a second bounding box 1504*b* for the second set of points 1502*b*, such that it encloses the second set of points 1502*b* and at least a portion of one or more other sets of points that are spatially proximate to the second set of points 1502*b* (e.g., the first set of point 1502*a*). In the example shown in FIG. 15B, the second bounding box 1504*b* is generated such that encloses both the second set of points 1502*b* and the first set of points 1502*a*.

In some implementations, the bounding boxes 1504*a* and 1504*b* can be quadrilaterals. For example, the bounding boxes 1504*a* and 1504*b* can be rectangles or squares.

The cluster refinement module 1310 analyzes the bounding boxes 1504*a* and 1504*b* and determines whether to merge the bonding boxes 1504*a* and 1504*b* (and/or the points enclosed therein). In some implementations, this determination can be performed based on a non-maximal suppression (NMS) technique. For instance, the cluster refinement module 1310 can determine whether the bounding boxes 1504*a* and 1504*b* enclose points that represent the same type of object. If so, the bounding box that is associated with a greater confidence metric can be selected, and the other bounding boxes can be discarded or suppressed. Accordingly, multiple sets of points are merged into a single set or cluster of points (e.g., enclosed by a single common bounding box). In some implementations, this determination can be performed, at least in part, using a neural network (e.g., a cluster classification network and/or a neural network 1400).

In this example, the cluster refinement module 1310 determines that the bounding box 1504*a* encloses points that represent a car, with a confidence metric of 0.75 (e.g., using a cluster classification network and/or a neural network 1400). Further, the cluster refinement module 1310 determines that the bounding box 1504*b* encloses points that also represent a car, with a confidence metric of 0.95 (e.g., using a cluster classification network and/or a neural network 1400).

Based on these determinations, the cluster refinement module 1310 can select the bounding box 1504*b* (e.g., corresponding to the greater confidence metric), and discard or suppress the bounding box 1504*a* (e.g., as shown in FIG. 15C). Further, the points that are enclosed by the selected bounding box 1504*b* can be merged into a single set of cluster of points 1502*c*, and can be used to represent a single common object (e.g., a single car, rather than multiple different cars).

Data regarding the selected bounding box and/or the points enclosed by the bounding box can be outputted for further processing. For example, data regarding the selected bounding box and/or the points enclosed by the bounding box can be used to aid in tracking the identities and locations of objects in the environment of the AV 100 over time. In some implementations, this data can be used to determine the classified objects 416 (e.g., as described with reference to FIG. 4) to aid in the generation of one or more trajectories by the planning module 404.

Although an example point cloud 1500 is shown in FIGS. 15A-15C, this point cloud is merely a simplified representation. In practice, a point cloud 1500 can include any number of points representing any number of objects. Further, the process shown in FIGS. 15A-15C can be performed to correct over-segmentation of any number of clusters of points in the point cloud 1500.

Figures 16A, 16B, 16C:
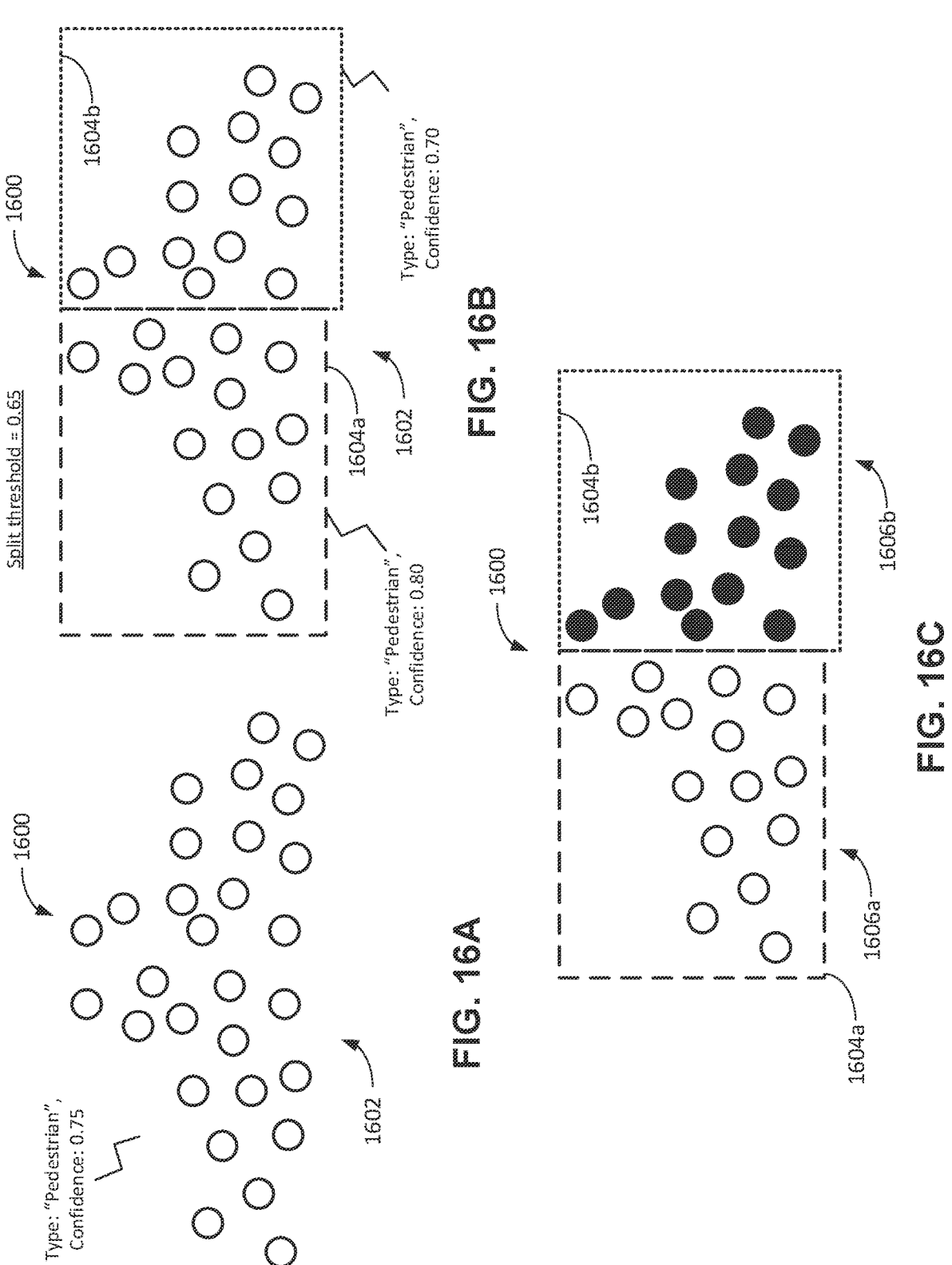
FIGS. 16A-16C show an example process for correcting under-segmentation of a point cloud.

FIGS. 16A-16C show an example process for correcting under-segmentation. This process can be performed, for example, by the cluster classification network 1306 and the cluster refinement module 1310 to modify the output of the cluster segmentation module 1314.

As shown in FIG. 16A, a point cloud 1600 is initially segmented into a single set of points 1602. This segmentation can be the output of the cluster segmentation module 1314.

For example, as shown FIG. 16A, the cluster segmentation module 1314 can initially predict that the point cloud 1600 represents a single object in the environment of the AV 100. Further, the cluster segmentation module 1314 can initially predict that a single set of points 1602 (represented by white circles) corresponds to that object.

The cluster classification network classifies the set of points 1602 that is output by the cluster segmentation module 1314. As an example, the cluster classification network 1306 can predict a type of object represented by the set of points 1602, and a confidence metric associated with the prediction. For instance, in this example, the cluster classification network 1306 predicts that the set of points 1602 represents a pedestrian, with a confidence metric of 0.75.

The cluster refinement module 1310 analyzes the point cloud 1600 to determine whether the set of points 1602 in fact correspond to a multiple different objects, rather than a single common object.

For instance, the cluster refinement module 1310 can generate at least two bounding boxes 1604*a* and 1604*b*, such that they enclose different respective portions of the set of points 1602. In some implementations, the bounding boxes 1604*a* and 1604*b* can be quadrilaterals. For example, the bounding boxes 1604*a* and 1604*b* can be rectangles or squares.

For each of the bounding boxes 1604*a* and 1604*b*, the cluster refinement module 1310 can determine the type of object represented by the points enclosed by that bounding box, and a confidence metric associated with that determination (e.g., using a cluster classification network and/or a neural network 1400). If the confidence metrics for both of the bounding boxes 1604a and 1604b are sufficiently high (e.g., both confidence metrics are greater than a threshold value), the cluster refinement module 1310 can split the set of points 1602 into two different sets of points in accordance with the bounding boxes 1604a and 1604b. Otherwise, the cluster refinement module 1310 can maintain the set of point 1602 as a single set or cluster of points.

In this example, the cluster refinement module 1310 determines that the bounding box 1604a encloses points that represent a pedestrian, with a confidence metric of 0.80 (e.g., using a cluster classification network and/or a neural network 1400). Further, the cluster refinement module 1310 determines that the bounding box 1604b encloses points that also represent a pedestrian, with a confidence metric of 0.70 (e.g., using a cluster classification network and/or a neural network 1400). Further, the cluster refinement module 1310 determines that the confidence metric for the bounding boxes 1604a and 1604b both exceed a split threshold of 0.65.

Based on these determinations, the cluster refinement module 1310 can split the set of points 1602 into a first set of points 1606a that are enclosed by the bounding box 1604a, and into a second set of points 1606b that are enclosed by the bounding box 1604b (e.g., as shown in FIG. 16C). The first set of points 1606a and the second set of points 1606b can be used to represent different respective objects (e.g., multiple pedestrians, rather than a single common pedestrian).

Data regarding the bounding boxes and/or the points enclosed by the bounding boxes can be outputted for further processing. For example, data regarding the bounding boxes and/or the points enclosed by the bounding boxes can be outputted to the planning module 404 to determine one or more trajectories for the AV 100.

Although an example split threshold value is describe above, this is merely an illustrative example. In practice, the split threshold value can vary, depending on the implementation. In some implementation, the split threshold value can be selected empirically (e.g., by performing experiments to determine a particular confidence metric value that enables an accurate correction of under-segmentation).

Although an example point cloud 1600 is shown in FIGS. 16A-16C, this point cloud is merely a simplified representation. In practice, a point cloud 1600 can include any number of points representing any number of objects. Further, the process shown in FIGS. 16A-16C can be performed to correct under-segmentation of any number of clusters of points in the point cloud 1600.

Example Processes

FIG. 17A shows an example process 1700 for improving the segmentation of a point cloud. The process 1700 can be performed, at least in part, using a perception module 402 that includes an AV cluster segmentation and classification system 1302 (e.g., as described with reference to FIGS. 13, 14, 15A-15C, and 16A-16C) to correct over-segmentation of a point cloud.

According to the process 1700, a perception module receives first data representing a point cloud having a plurality of points (block 1702). In some implementations, the points can be generated by a LiDAR sensor. For example, the perception module can receive the first data based on measurements corresponding to each of the plurality of points generated by at least one LiDAR sensor.

The perception module clusters the points into a plurality of clusters (block 1704). The points may be over-segmented, such that multiple clusters represent different respective portions of the same object (e.g., the same vehicle, pedestrian, obstacle, etc.). As an example, the clusters can include a first cluster representing a first portion of an object and a second cluster representing a second portion of the object. Example clusters of points are shown and described with reference to FIG. 15A.

In some implementations, the points can be clustered using a cluster classification network (e.g., the cluster classification network 1306 described with reference to FIG. 13). For example, the cluster classification network can be used to predict, for each of the clusters, a type of object represented by that cluster. Example types of objects include a vehicle, pedestrian, obstacle, or any other type of object. Further, the cluster classification network can be used to determine, for each of the clusters, a likelihood of that cluster representing the predicted type of object. In some implementations, the likelihood can be represented using a confidence metric.

The perception module generates a first bounding box enclosing at least the first cluster and the second cluster (block 1706). In some implementations, the first cluster can be adjacent the second cluster.

The perception module also generates a second bounding box enclosing at least the first cluster and the second cluster (block 1708). The first bounding box is different from the second bounding box. In some implementations, the first bounding box and/or the second bounding box can be a quadrilateral, such as a rectangle or a square. In some implementations, the first cluster can be spatially adjacent the second cluster. Example bounding boxes are shown and described with reference to FIG. 15B.

The perception module selects either the first bounding box or the second bounding box (block 1710). An example selection of a bounding box is shown and described with reference to FIG. 15C.

In some implementations, the selection can be made based on a non-maximal suppression technique. For example, the perception module can predict that the first cluster represents a first type of object (e.g., a vehicle, pedestrian, obstacle, etc.), and can determine a first likelihood that the first cluster represents the first type of object. Further, the perception module can predict that the second cluster represents a second type of object (e.g., a vehicle, pedestrian, obstacle, etc.), and determine a second likelihood that the second cluster represents the second type of object. Further, the perception module can determine that the first type of object and the second type of object are the same, and determine that the first likelihood is greater than the second likelihood. Based on these determinations, the perception module can selecting the first bounding box.

The perception module outputs second data representing the object (block 1712). The second data includes an indication of the selected bounding box and an indication of the object. In some implementation, the second data can be used to track and predict the location/movement of the object. For example, the second data can be output to planning circuitry of a vehicle that is configured to determine at least one trajectory for the vehicle based on the second data (e.g., the planning module 404 shown and described with reference to FIG. 4).

FIG. 17B shows another example process 1750 for improving the segmentation of a point cloud. The process 1750 can be performed, at least in part, using a perception module 402 that includes an AV cluster segmentation and classification system 1302 (e.g., as described with reference to FIGS. 13, 14, 15A-15C, and 16A-16C) to correct under-segmentation of a point cloud.

According to the process 1750, a perception module receives first data representing a point cloud having a plurality of points (block 1752). In some implementations, the points can be generated by a LiDAR sensor. For example, the perception module can receive the first data based on measurements corresponding to each of the plurality of points generated by at least one LiDAR sensor.

The perception module clusters the points into a plurality of clusters (block 1754). The points may be under-segmented, such that a single cluster represent multiple different objects. For example, the clusters can include a first cluster representing at least a portion of a first object and at least a portion of a second object. An example cluster of points is shown and described with reference to FIG. 16A.

In some implementations, the points can be clustered using a cluster classification network (e.g., the cluster classification network 1306 described with reference to FIG. 13). For example, the cluster classification network can determine the first type of object and the second type of object. Further, the cluster classification network can determine the first confidence metric and the second confidence metric.

The perception module generates a first bounding box enclosing a first portion of the first cluster (block 1756).

The perception module generates a second bounding box enclosing a second portion of the first cluster (block 1758). The first portion of the first cluster is different from the second portion of the first cluster. In some implementations, the first bounding box and/or the second bounding box can be a quadrilateral, such as a rectangle or a square. In some implementations, the first bounding box and the second bounding box do not overlap. In some implementations, the first bounding box can be spatially adjacent to the second bounding box. Example bounding boxes are shown and described with reference to FIG. 16B.

The perception module determines a first confidence metric for the first bounding box (block 1760). The first confidence metric indicates a likelihood that the points enclosed by the first bounding box represent a first type of object. In some implementations, the first confidence metric can be output by the cluster classification network.

The perception module determines a second confidence metric for the second bounding box (block 1762). The second confidence metric indicates a likelihood that the points enclosed by the second bounding box represent a second type of object. In some implementations, the second confidence metric also can be output by the cluster classification network.

In response to the first confidence metric and the second confidence metric exceeding a threshold value, the perception module outputs second data representing the first object and third data representing the second object (block 1764). The second data includes an indication of the first bounding box and an indication of the first type of object. The third data includes an indication of the second bounding box and an indication of the second type of object.

In some implementations, the first confidence metric and the second confidence metric exceeding the threshold value may indicate that the points in each of the boxes are sufficiently likely to represent a respective type of object.

In some implementations, in response to the first confidence metric being less than the threshold value, the perception module can determine that the first cluster and the second cluster represent a common object. Based on this determination, the perspective system can output fourth data representing the common object. The fourth data can include an indication of the third bounding box enclosing the first portion of the first cluster and the second portion of the first cluster (e.g., output a single bounding box enclosing the first cluster). Further, the fourth data can include an indication of the second type of object. In some implementations, the first confidence metric being less than the threshold value may indicate that the points in one of the boxes are not sufficiently likely to represent a respective type of object.

In some implementation, the second data and the third data can be used to track and predict the location and/or movement of two or more objects. For example, the second data and the third data can be output to planning circuitry of a vehicle that is configured to determine at least one trajectory for the vehicle based on the second data and the third data (e.g., the planning module 404 shown and described with reference to FIG. 4).

In the foregoing description, several embodiments have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:

receiving, by a perception system, first data representing a point cloud having a plurality of points;

clustering, by the perception system, the points into a plurality of clusters, wherein the clusters comprise a first cluster representing a first portion of an object and a second cluster representing a second portion of the object;

generating, by the perception system, a first bounding box enclosing at least the first cluster and the second cluster;

generating, by the perception system, a second bounding box enclosing at least the first cluster and the second cluster, wherein the first bounding box is different from the second bounding box;

selecting, by the perception system, either the first bounding box or the second bounding box, wherein selecting either the first bounding box or the second bounding box comprises at least one of:

(i) predicting that the first cluster represents a first type of object, and determining a first likelihood that the first cluster represents the first type of object, or (ii) predicting that the second cluster represents a second type of object, and determining a second likelihood that the second cluster represents the second type of object;

outputting, by the perception system, second data representing the object, wherein the second data comprises an indication of the selected bounding box and an indication of the object; and causing a vehicle to operate in accordance with the second data.

2. The method of claim 1, wherein at least one of the first bounding box or the second bounding box is a quadrilateral.

3. The method of claim 1, wherein receiving the first data representing the point cloud comprises:

receiving the first data representing the point cloud based on measurements corresponding to each of the plurality of points generated by at least one LiDAR sensor.

4. The method of claim 1, wherein the points are clustered into the plurality of clusters using a cluster classification network, and wherein the method further comprises:

predicting, using the cluster classification network, for each of the clusters, a type of object represented by that cluster, and determining, using the cluster classification network, for each of the clusters, a likelihood of that cluster representing the predicted type of object.

5. The method of claim 1, wherein the first cluster is spatially adjacent to the second cluster.

6. The method of claim 1 wherein selecting either the first bounding box or the second bounding box comprises:

determining that the first type of object and the second type of object are the same;

determining that the first likelihood is greater than the second likelihood; and selecting the first bounding box based on determining that the first type of object and the second type of object are the same and determining that the first likelihood is greater than the second likelihood.

7. The method of claim 1, wherein second data is output to planning circuitry of a vehicle, wherein the planning circuitry is configured to determine at least one trajectory for the vehicle based on the second data.

8. A system comprising:

at least one processor; and at least one non-transitory computer readable medium storing instructions that, when executed by the at least one processor, cause the at least one processor to perform the method of claim 1.

9. At least one non-transitory computer readable medium storing instructions that, when executed by at least one processor, cause the at least one processor to perform the method of claim 1.

10. A method comprising:

receiving, by a perception system, first data representing a point cloud having a plurality of points;

clustering, by the perception system, the points into a plurality of clusters, wherein the clusters comprise a first cluster representing at least a portion of a first object and at least a portion of a second object;

generating, by the perception system, a first bounding box enclosing a first portion of the first cluster;

generating, by the perception system, a second bounding box enclosing a second portion of the first cluster, wherein the first portion of the first cluster is different from the second portion of the first cluster;

determining, by the perception system, a first confidence metric for the first bounding box, wherein the first confidence metric indicates a likelihood that the points enclosed by the first bounding box represent a first type of object;

determining, by the perception system, a second confidence metric for the second bounding box, wherein the second confidence metric indicates a likelihood that the points enclosed by the second bounding box represent a second type of object;

responsive to the first confidence metric and the second confidence metric exceeding a threshold value, outputting, by the perception system:

second data representing the first object, wherein the second data comprises an indication of the first bounding box and an indication of the first type of object, and third data representing the second object, wherein the third data comprises an indication of the second bounding box and an indication of the second type of object; and causing a vehicle to operate in accordance with the second data.

11. The method of claim 10, wherein at least one of the first bounding box or the second bounding box is a quadrilateral.

12. The method of claim 10, wherein receiving the first data representing the point cloud comprises:

receiving the first data representing the point cloud based on measurements corresponding to each of the plurality of points generated by at least one LiDAR sensor.

13. The method of claim 10, wherein the points are clustered into the plurality of clusters using a cluster classification network, and wherein the first type of object and the second type of object are determined by the cluster classification network, and wherein the first confidence metric and the second confidence metric are determined by the cluster classification network.

14. The method of claim 10, wherein the first bounding box and the second bounding box do not overlap.

15. The method of claim 10, wherein the first bounding box is spatially adjacent to the second bounding box.

16. The method of claim 10, responsive to the first confidence metric being less than the threshold value:

determining that the first bounding box and the second bounding box represent a common object; and outputting, by the perception system, fourth data representing the common object, wherein the fourth data comprises:

an indication of a third bounding box enclosing the first portion of the first cluster and the second portion of the first cluster, and an indication of the second type of object.

17. The method of claim 10, wherein the second data and the third data are output to planning circuitry of a vehicle, wherein the planning circuitry is configured to determine at least one trajectory for the vehicle based on the second data and the third data.

18. A system comprising:

at least one processor; and at least one non-transitory computer readable medium storing instructions that, when executed by the at least one processor, cause the at least one processor to perform the method of claim 10.

19. At least one non-transitory computer readable medium storing instructions that, when executed by at least one processor, cause the at least one processor to perform the method of claim 10.

* * * * *